Aug. 22, 1944.                D. G. ROOS                2,356,180
                        VEHICLE CONSTRUCTION
                        Filed Nov. 27, 1941            7 Sheets-Sheet 2

Fig 2

INVENTOR.
DELMAR G. ROOS
BY
         ATTORNEYS.

Both Normal
Fig 13

One Up - One Down
Fig 14

One Up - One Normal
Fig 15

Both Up
Fig 16

Both Down
Fig 17

One Down–One Normal
Fig 18

INVENTOR.
BY DELMAR G. ROOS
ATTORNEYS.

Patented Aug. 22, 1944

2,356,180

UNITED STATES PATENT OFFICE 2,356,180

VEHICLE CONSTRUCTION

Delmar G. Roos, Toledo, Ohio, assignor, by mesne assignments, to Willys-Overland Motors, Inc., Toledo, Ohio., a corporation of Delaware Application November 27, 1941, Serial No. 420,644

10 Claims. (Cl. 180—22)

This invention relates to spring suspension for motor vehicles, and more particularly to vehicles of heavy duty or commercial type wherein the four rear wheels are mounted on tandem driving axles.

One of the principal objects of the invention is to provide means of mounting or connecting the axles to the chassis frame in such a manner so as to permit independent vertical movement of the axles with respect to the frame without setting up undue strains in the connecting means, or materially restricting the flexibility of the springs as the vehicle travels upon rough or uneven road surfaces or terrain.

A further object of the invention is to provide an arrangement of tandem drive axles in conjunction with a pair of springs on each side of the frame positioned above and below the axles, the springs being pivotally supported upon the frame to permit the axles to swing or move in a vertical direction.

A further object of the invention is the provision of simple, durable and inexpensive arrangement for connecting tandem axles to the vehicle frame.

A further object of the invention is the provision of means for maintaining two driving axles at all times substantially in spaced vertical parallel planes, the arrangement including means for effectively controlling or resisting the driving and braking torque exerted on the axle housings.

A further object of the invention is to provide a spring suspension for tandem axles in which road shocks are partially absorbed by a secondary compensating or axle movement limiting device.

A further object of the invention is to provide tandem rear axles for a motor driven vehicle with a drive to both axles to increase the tractive power of the vehicle.

Still another object of the invention is an arrangement of linkage whereby the drive wheels are capable of independent vehicle movement with respect to the frame but arranged to resist lateral movement of the wheel and axle construction with respect to the frame whereby the wheels and frame are at all times held in parallel relationship.

Further objects and advantages are within the scope of this invention such as relates to the arrangement, operation and functioning of the related elements of the structure, to various details of construction and to combination of parts, elements per se, and to economies of manufacture and numerous other features as will be apparent from a consideration of the specification and drawings of a form of the invention, which may be preferred, in which:

Figure 1:
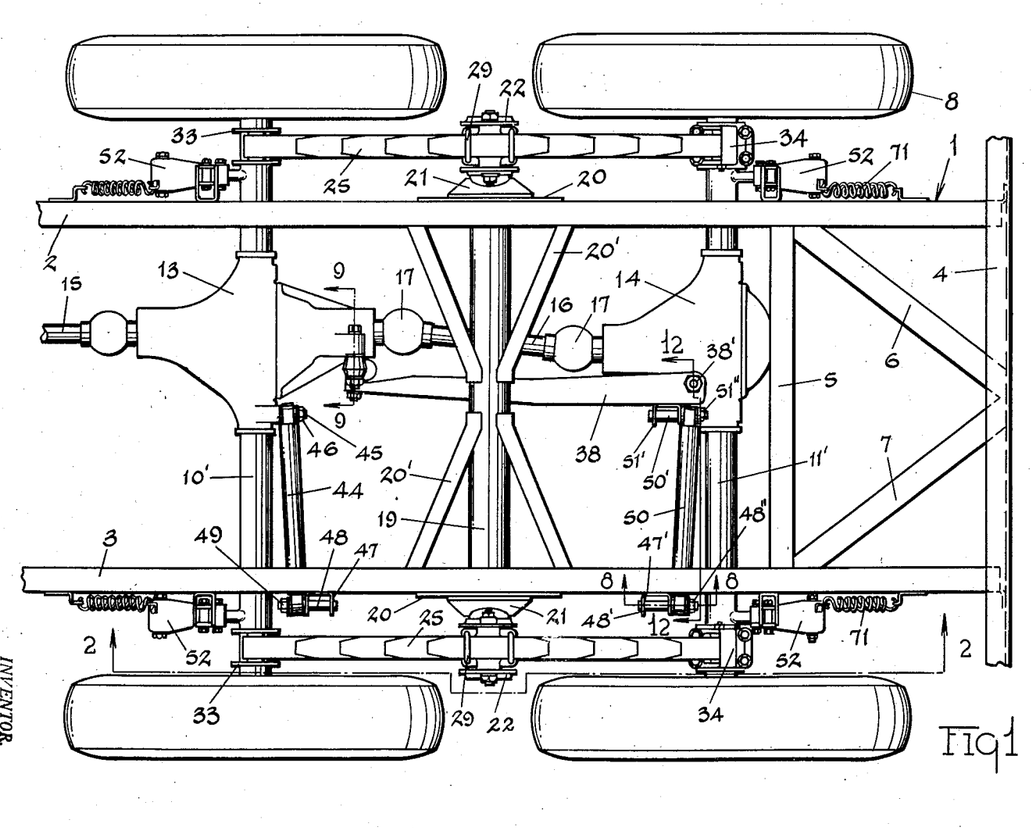
Figure 1 is a top plan view of the rear portion of a motor vehicle embodying the invention particularly illustrating the torque arms or linkage arranged between the axle constructions.
Figure 2:
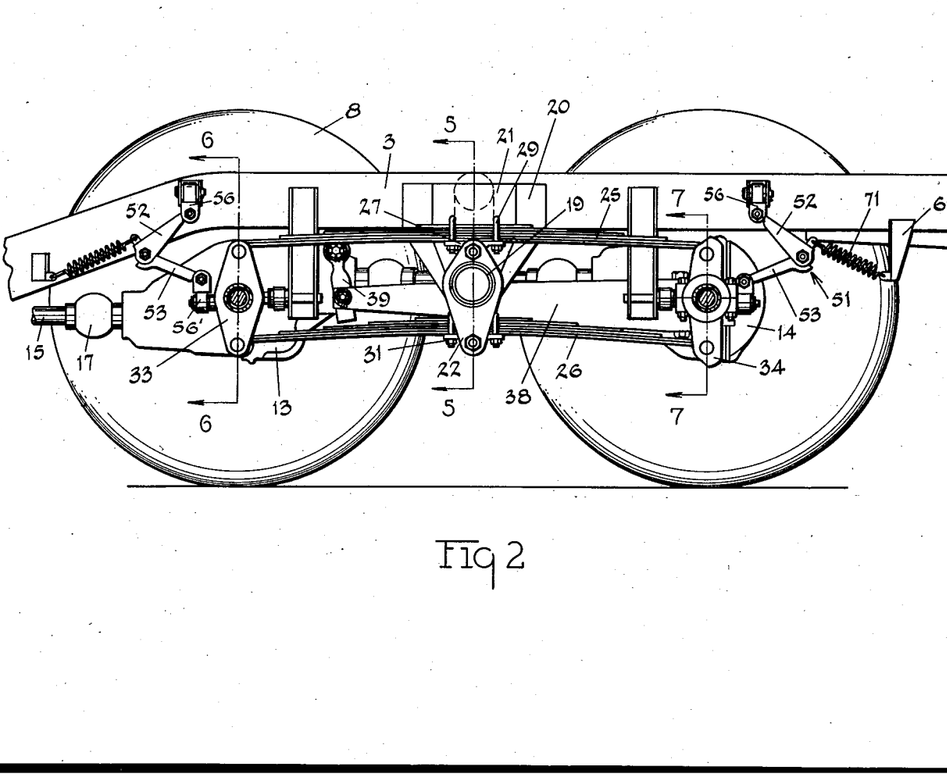
Figure 2 is a vertical longitudinal sectional view taken substantially on line 2—2 of Figure 1.

Referring to the drawings in detail, and more particularly to Figures 1 and 2, there is illustrated an arrangement of the invention carried by a chassis frame structure 1, a portion of which is shown in these figures, and is inclusive of longitudinally arranged parallel panel frame members 2 and 3 which are connected at their rear extremities by means of a bar 4, the frame structure being reenforced by cross member 5 and diagonally arranged struts 6 and 7. Positioned beneath the frame is a pair of spaced parallel drive axles 10 and 11 enclosed within suitable tubular housings 10' and 11'.

Figure 3:
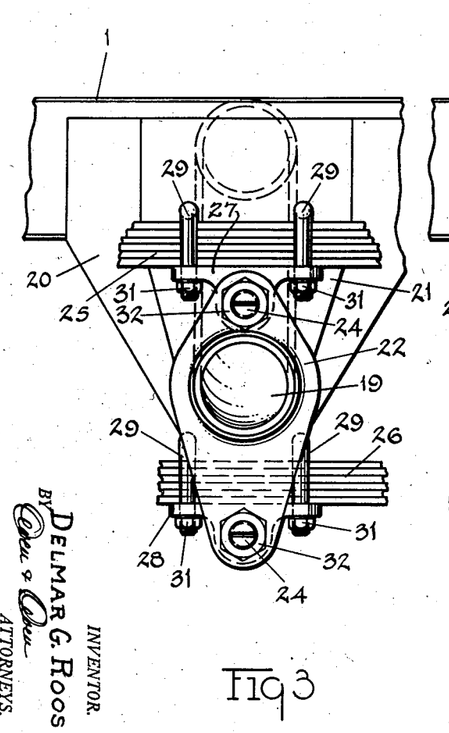
Figure 3 is an enlarged elevational view showing one of the spring hangers or supports forming part of the invention.
Figure 5:
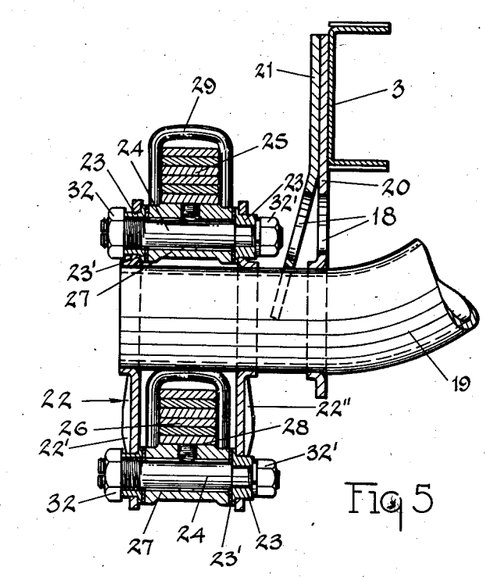
Figure 5 is a sectional view taken substantially on line 5—5 of Figure 2, showing the pivotal support for the springs.

Intermediate the sections of the axle housings 10' and 11' are differential housings 13 and 14 enclosing the differential gear drive of conventional construction. A propeller shaft 15 which is suitably connected to a transmission and engine (not shown), directly drives the forward axle 10, and a second propeller shaft 16 incorporating universal joints 17 establishes a drive to the rear axle 11 direct from the front axle driving means. The universal joints 17 and the propeller shafts 15 and 16 are provided with conventional spline connections (not shown) to accommodate the relative vertical movements of the axles with respect to the frame structure during the operation of the vehicle. Secured to the frame 1 is a transverse tube or member 19 supported by brackets 20 and reinforcing arms or struts 20', the member 19 being positioned midway between the axles, and the brackets 20 and struts 20' being secured to the frame by welding or other suitable means. Reinforcing brace or strut plates 21 are provided which are securely welded or otherwise secured to the frame brackets 20 and to the transverse member 19 as particularly shown in Figure 5 so as to prevent any lateral or twisting movement of the transverse member or shaft 19 with respect to the frame 1. The brackets 20 and brace plates 21 have aligned openings 18 so as to provide the spring connections hereinafter described. The projecting ends of the member 19 are provided with stationary spring hangers or supports 22 which are fixedly secured thereto by welding or other suitable means, each hanger being formed of a pair of hangers having spaced plates 22' and 22" provided with openings adapted to receive the reduced portion of spacing collars 23. As shown in the drawings, a pair of longitudinally disposed leaf spring assemblies 25 and 26 each made up of a plurality of juxtaposed spring leaves are arranged on each side of the vehicle frame one above the other. As the leaf spring assemblies and associated elements and parts thereof arranged on each side of the vehicle frame are identical in construction, a description in detail of one of such assemblies will suffice. Each spring assembly is provided with a bracket 27 having a horizontally disposed spring seat or pad 28 adapted to support the leaf springs at their centers as shown in Figures 2 and 3. The leaves of said springs are clamped together and to the spring seat by means of U-bolts 29 placed astraddle the springs with their lower ends passing through openings in the brackets 27, the end portions being threaded to receive nuts 31. The spring supporting brackets are positioned between the spacers 23 and thrust washers 23' and are bored to receive trunnion pins or stub shafts 24. As shown in Figure 5, the outermost of the spacers 23 are threaded to receive the threaded outer ends of the trunnion pins 24, nuts 32 serving to lock the outer spacers to the trunnions. The other ends of the trunnion pins have reduced tenon portions which receive spacers or collars 23. The tenon portions of the trunnion pins 24 are threaded to receive nuts 32' which secure the inner spacers 23 in position. Through this arrangement of securing the trunnion pins and spacers in the spring hangers, adjustment of the outermost spacers may be secured through the threaded connection between these spacers and the trunnions and the adjustment maintained by means of nuts 32. This adjustment is provided so that the spacers do not bind upon the spring seats 27, but permit the latter to have relative pivotal or journal movement upon the trunnion pins 24.

Figure 6:
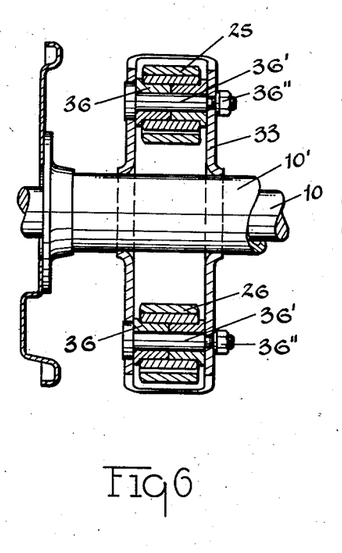
Figure 6 is a sectional view taken substantially on line 6—6 of Figure 2, showing the means for securing the forward ends of the springs to the forward axle.

Mounted upon the outer portions of the forward axle housing 10' are hangers or shackles 33 which are welded or otherwise secured as particularly shown in Figure 6. Positioned above and below the axle housing 10' are stud shafts or pins 36' extending through openings in the side walls of the shackles 33. The headed pins 36' are provided with threaded tenon portions to receive the nuts 36", the latter serving to hold the pins 36' to the shackles 33. Journalled upon the pins 36' are bushings 36 contained within eyes formed on the ends of the leaf spring assemblies 25 and 26, the springs being thus pivotally connected to the hangers or shackles 33.

Figure 4:
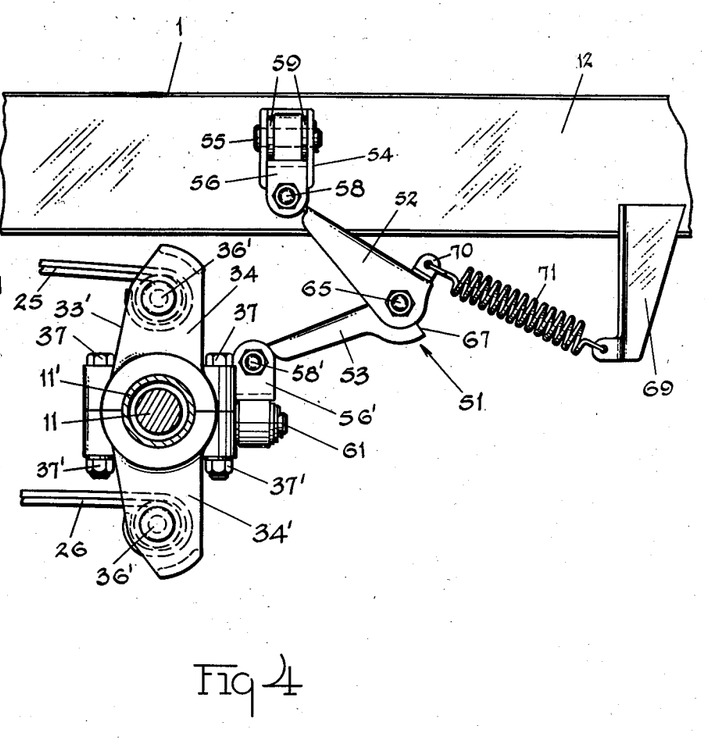
Figure 4 is an enlarged elevational view of the means for connecting the rear ends of the spring arrangement to one of the axles.
Figure 7:
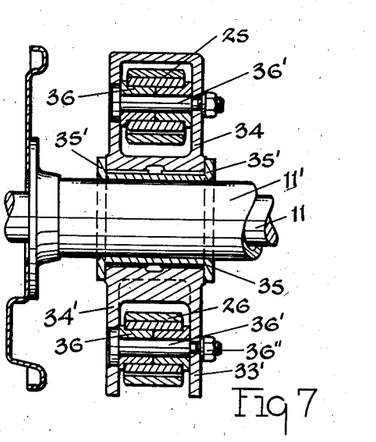
Figure 7 is a sectional view taken substantially on line 7—7 of Figure 2.
Figure 8:
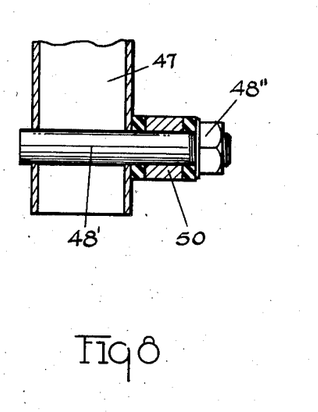
Figure 8 is a detail sectional view taken substantially on line 8—8 of Figure 1.

The rear portions of the spring assemblies 25 and 26 are connected together by means of shackles or hangers 33', each made up of sections 34 and 34' as particularly illustrated in Figure 4, the sections being held together by means of machine screws 37 and nuts 37'. As shown in Figure 7, the extremities of the springs 25 and 26 are connected respectively to the sections 34 and 34' of the spring shackle in the same manner as described in connection with the forward structure of the springs and their connection to the shackles 33 as shown in Figure 6. The rear shackles 33', each of which is made up of sections 34 and 34', are adapted to be mounted for relative pivotal movement about the axis of the axle housing 11' and to this end a bushing 35 is welded to the axle housing and is provided with spaced shoulders 35' which serve to position the two sections 34 and 34' of the spring shackle. In this manner the shackle 33' is journalled upon the bushing 35 so as to permit relative rotatable movement between the axle housing 11' and the spring shackle 33'. Through this arrangement the rear axle housings are free to tilt or rotate in the spring shackles as the axles move in vertical directions without setting up torsional strains in the axle housings and associated parts during the operation of the vehicle.

It is imperative that the axle housings 10' and 11' be at all times maintained in a position wherein the vehicle wheels 8 will remain parallel with the frame construction during the operation of the vehicle. To this end I have provided means connecting the differential housings together and to the frame so as to maintain the proper relationship between the vehicle wheels, the axle housings and the frame under all conditions of operation.

Figures 9, 11:
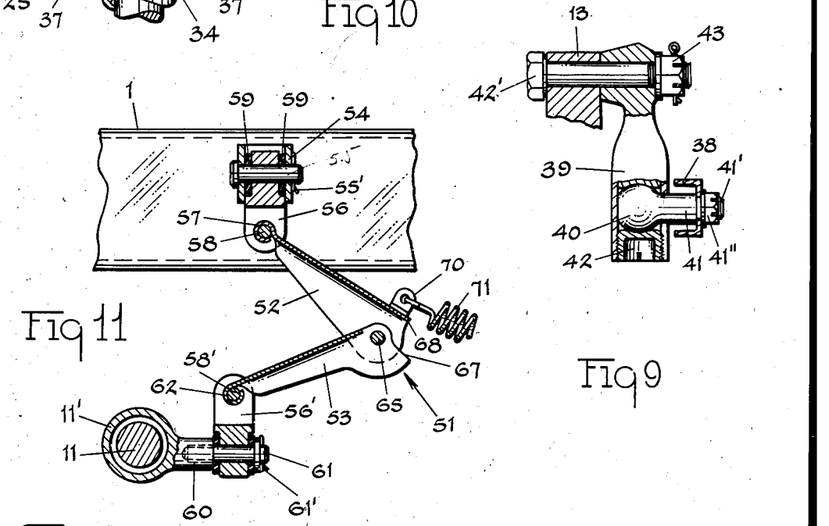
Figure 9 is a sectional view taken substantially on line 9—9 of Figure 1, illustrating the connection between the stabilizing linkage or torque arms.
Figure 11 is a sectional view taken substantially on the line 11—11 of Figure 10.
Figure 12:
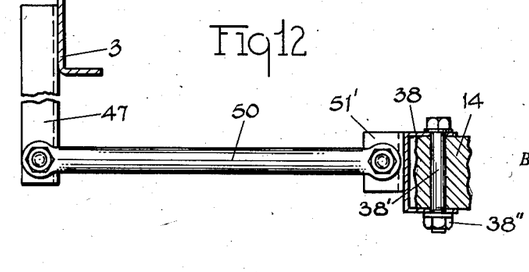
Figure 12 is an enlarged detail sectional view taken substantially on line 12—12 of Figure 1.

The differential housings 13 and 14 are connected together by links or torque arms 38 and 39. The torque arm 38 extends longitudinally of the frame adjacent the center line of the vehicle, one end being pivotally secured to the rear differential housing 14 by a bolt 38' having a threaded end to receive nut 38'', as shown in Figures 1 and 12. The other end of arm or link 38 is connected to the comparatively short torque arm 39 by means of a universal joint of the ball-and-socket type. As shown in Figure 9, this joint comprises a ball 40 formed on an extension 41 terminating in a threaded tenon 41' which extends through an opening in the arm 38 and held in place by means of a nut 41''. A suitable bearing seat 42 is provided in the hollow portion of the torque arm 39 to receive and position the ball 41. The torque arm 39 is pivotally secured to the front differential housing 13 in a substantially vertical position by means of bolt 42' having a threaded end to receive nut 43.

Means are provided for connecting the differential housings to the frame construction in order to maintain the lateral stability of the differential housing and axle constructions. The front differential housing 13 supports a stud 45 connected to one end of a rod or link 44, the link being held to the stud by means of a nut 46. The other end of the rod 44 is pivotally connected to a frame bracket 47 by means of a stud 48 and a nut 49, the frame bracket 47 being welded or otherwise fixedly secured to side rail or channel 3 of the frame construction. The rear differential housing is held against lateral movement by means of a link 50. The link 50 is not connected directly to the differential housing 14 but is connected to a bracket 51' which is welded or otherwise fixedly secured to the longitudinally extending link 38 which as has been previously stated is connected to the differential housing 14 through the medium of the bolt 38' as shown in Figures 1 and 12. The bracket 51' carries a stud member 50' which pivotally connects the link 50 to the bracket 51', the link being held in place by means of a nut 51''. The other end of the link 50 is connected to a stud 48' carried by a bracket 47', the latter being welded to the frame side rail 3, the link being held upon the stud 48' by means of a nut 48''.

By this arrangement the torque rods or links 38, 39, 44 and 50 establish a connection between the vehicle frame and the axle and differential assemblies which is substantially rigid in a horizontal plane whereby swinging or twisting movement of the axle and spring assemblies with respect to the frame in a horizontal plane is substantially prevented. This linkage in conjunction with the spring mountings prevents material lateral movement of the axle assemblies with respect to the frame. The linkage arrangement however permits substantially free vertical movement of each axle assembly and thus each axle is permitted to rise and fall above or below its normal position as the vehicle travels upon uneven road surfaces without setting up undue twists or torque in the driving mechanism or in the axle housings and their supporting means.

Figure 10:
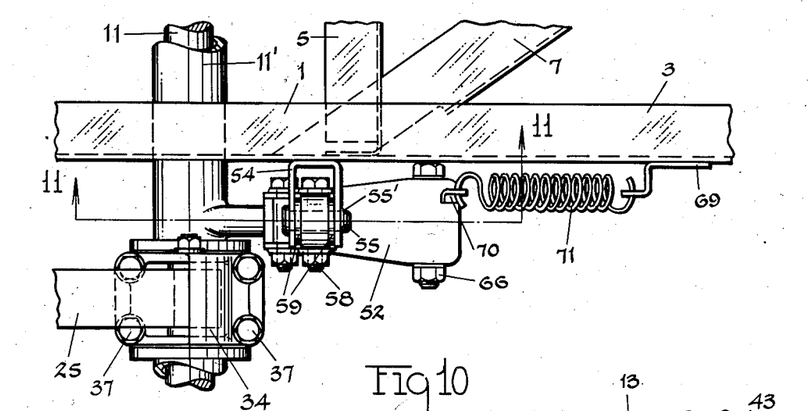
Figure 10 is an enlarged detail plan view illustrating the axle movement limiting mechanism arranged between the rear axle and the vehicle frame.

There is also provided means for controlling or limiting the downward movement of the axles as particularly shown in Figures 1, 10 and 11. In the embodiment illustrated, this means comprises four units, one for the end portion of each axle housing for connecting the same to the frame. Each unit comprises a pair of channel shaped interconnected arms 52 and 53 preferably formed of sheet material. Each unit is inclusive of a U-shaped bracket 54 welded or otherwise secured to the frame of the vehicle, the leg portions of each bracket being bored to receive a headed pin 55 which is held in place by means of a key 55'. Journalled upon pin 55 is a member 56 which is pivotally connected to an eye portion 57 formed on the extremity of the arm 52 as shown in Figure 11. A bolt 58 passes through the eye 57 in order to pivotally connect the arm 52 to the member 56. Surrounding pin 55 and interposed between the leg portions of bracket 54 and the member 56 are washers 59 preferably of non-metallic material as, for example, rubber or the like serving the purpose of anti-rattle means between the parts. As shown in Figure 11 each axle housing is provided with a projection 60 carrying stud 61. Mounted upon the stud 61 is a member 56' in construction identical with the member 56, the member 56' being held in place by means of a key 61'. The arm 53 is provided at its end portion with an eye 62 through which passes a bolt 58' thus establishing a pivotal connection between the arm 53 and member 56'. The arms 52 and 53 are pivotally connected together by means of a bolt 65 which is held in place by means of a nut 66. Arm 53 is formed with an abutment or ledge 67 which, when the axle housing is moved to its lowermost position, will engage the ledge 68 formed on arm 52 thus forming a limiting means for determining the extent of downward vertical movement of the axle and axle housing. Welded to each frame side rail is a bracket 69 and welded to each arm 52 is a bracket 70. Each of these brackets 69 and 70 is provided with openings into which extend the extremities of a contractile coil spring 71, the spring serving at all times to urge arms 52 and 53 into the respective positions as shown in Figure 11. When an axle is moved to its lowermost position to the limit permitted by the links 52 and 53, the spring 71 is thus extended and exerts a force in a direction tending to collapse links 52 and 53 as the axle or axle housing approaches its normal position.

Figure 13:
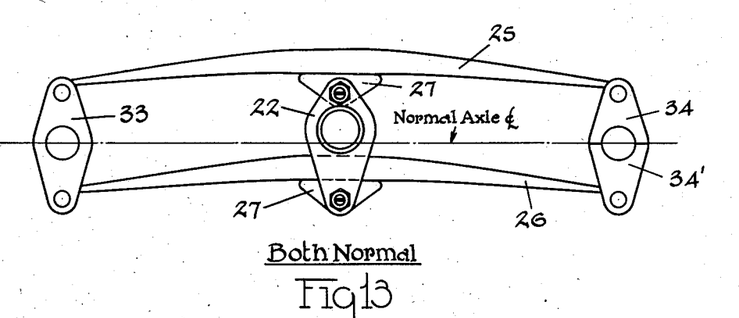
Figure 13 is a diagrammatic elevational view illustrating the axles and the springs in normal position.
Figure 14:
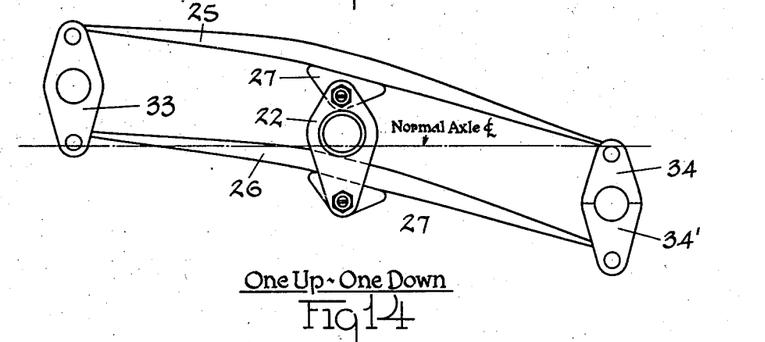
Figure 14 is a diagrammatic view illustrating the position of parts with one axle above and the other below normal position.
Figure 15:
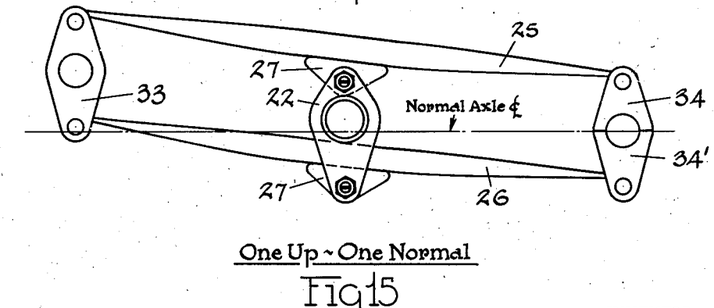
Figure 15 is a diagrammatic view illustrating the position of parts with one of the axles in normal position and the other above normal position.
Figure 16:
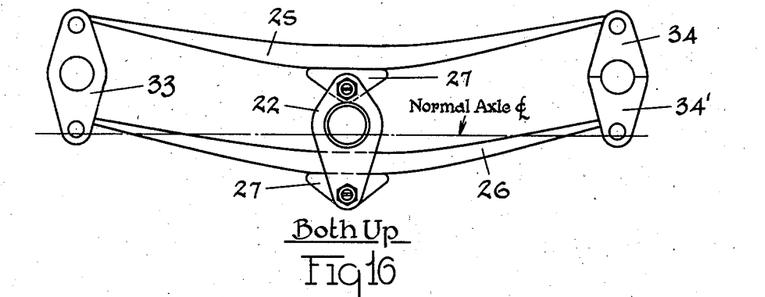
Figure 16 is a diagrammatic view illustrating the position of parts with both of the axles above normal position.
Figure 17:
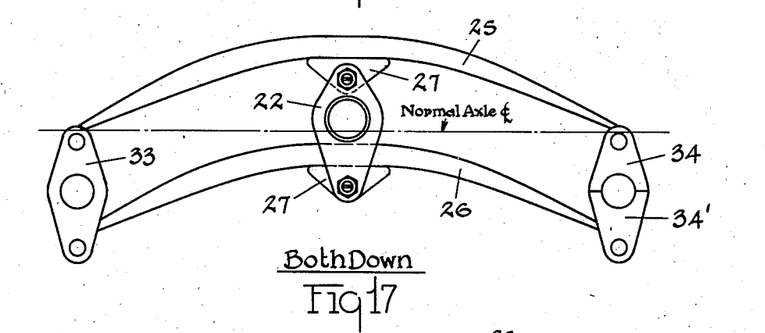
Figure 17 is a diagrammatic view illustrating the position of parts with both of the axles below normal position.
Figure 18:
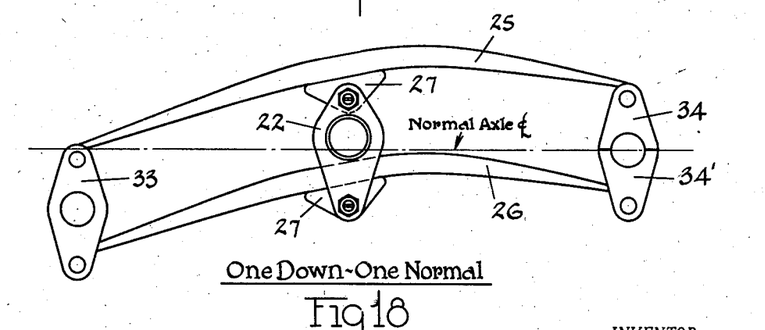
Figure 18 is a diagrammatic view illustrating the position of parts with one of the axles in normal position and the other below normal position.

Figures 13 through 18, inclusive, illustrate the relative positions of the spring assemblies, the spring shackles and axle housings under various conditions of road irregularities. Figure 13 illustrates the arrangement of parts in normal position; Figure 14 illustrating the condition when one axle is elevated and the other moved downwardly below its normal position; Figure 15 illustrating the position with the forward axle housing elevated and the rear axle housing in normal position; Figure 16 illustrating the condition when both axle housings are elevated above normal position; Figure 17 illustrating the condition when both axle housings are below normal position while Figure 18 illustrates the position of parts when the forward axle housing is below normal position and the rear axle housing in normal position. According to the present invention, each wheel is capable of substantially independent vertical movement, yet, through the employment of the linkage hereinbefore described, the axles will always remain in proper operative position with respect to the frame and the wheels in proper alignment irrespective of the road irregularities. Moreover, by such an arrangement in conjunction with the means for limiting downward vertical movement of the axles, the maximum operating angles of the universal joints are maintained within proper limits.

It is apparent that, within the scope of the invention, modifications and different arrangements may be made other than is herein disclosed, and the present disclosure is illustrative merely, the invention comprehending all variations thereof.

What I claim is:

1. The combination with a road vehicle frame of a driving arrangement comprising a pair of driving axles; housings for said axles; a pair of shackles journalled on one of said housings; a second pair of shackles fixedly secured to the other of said housings; a spring hanger supported at each side of said vehicle frame; a pair of springs arranged adjacent each side of the vehicle frame; each of said pairs of springs being pivotally connected at their ends to said shackles; and means for pivotally connecting said springs intermediate their ends to said hangers.

2. The combination with a motor vehicle frame; of a pair of substantially parallel driving axles; housings enclosing said axles and disposed to support one end of said frame; said axles having wheels mounted thereon; vertically spaced springs arranged above and below said axles adjacent both sides of said frame; means connecting the springs to said axle housings; each spring being pivotally connected intermediate its ends to said frame; means connecting said frame and said axle housings for limiting the vertical downward movement of said axles; said means including a pair of interconnected arms normally disposed at an angle to each other less than 180°; said arms pivotally connecting the axle housings to said frame; and spring means associated with said arms for urging said arms toward normal position.

3. The combination with a road vehicle frame; of a driving truck comprising driving axles; housings for said axles; said axles having wheels mounted thereon; shackles rotatably mounted on one of said axle housings; shackles fixedly secured to the other axle housing; pairs of springs pivotally connecting said rotatably mounted and fixed shackles; a transverse member carried by said frame; spring connections carried by said member upon which each spring is pivotally connected at its center; means to limit the vertical movement of said axles including a pair of arms pivotally connected to the axle housings and to said frame; and resilient means for controlling the movement of said arms.

4. The combination with a road vehicle frame; of a driving truck comprising a pair of driving axles; housings for said axles; said axles having wheels mounted thereon; shackles rotatably mounted on one of said axle housings; shackles fixedly secured to the other axle housing; pairs of springs pivotally connected to said shackles; a transverse shaft carried by said frame and provided with spring connections upon which each spring is pivotally connected at its center; means to limit the downward movement of said axles and housings including a pair of arms pivotally connecting the housings to said frame; resilient means for controlling the movement of said arms; said axles having substantially rigid link connections to said frame in a horizontal plane; said connections being yieldable to accommodate movement of the axles in a vertical direction; and torque resisting arms arranged between the axles to resist the reactions due to braking and driving torque.

5. The combination with a road vehicle frame; of a driving truck comprising driving axles; housings for said axles; said axles having wheels mounted thereon; hangers rotatably mounted on one of said axle housings; hangers fixedly secured to the other axle housing; a pair of springs at each side of the vehicle pivotally connected at their ends to said hangers; a transverse shaft carried by said frame and provided with spring connections upon which the springs are pivotally connected at their centers; torque resisting connections between said axle housings; said connections being yieldable to accommodate swinging of the axles in a vertical direction; and links pivotally connecting the axle housings to said frame in a transverse plane for resisting lateral movement of said axles.

6. A road vehicle comprising a frame; a pair of substantially parallel axles disposed beneath one end of said frame; housings for said axles; a drive connection between said axles; wheels mounted on said axles; pairs of springs arranged on each side of said frame; hangers rotatably mounted on one of said axle housings; hangers fixedly secured to the other axle housing; said springs being pivotally connected at their ends to said hangers and pivotally connected at their centers to the vehicle frame; and torque resisting linkage between said axle housings; said connections being yieldable to permit the axles to swing in a vertical direction; and linkage connecting said housings and said frame for resisting transverse movement of said housings with respect to said frame.

7. The combination with a road vehicle frame; of a driving truck comprising driving axles; said axles having housings; a drive connection between said axles; wheels mounted on said axles; a pair of springs pivotally connected at their ends to said axle housings and pivotally connected at their centers to the vehicle frame; means to limit the downward movement of said axles including a pair of arms pivotally connecting the axle housings to said frame; spring means for controlling the movement of said arms; yieldable torque connections between said housings to accommodate swinging movement of the axles in a vertical direction; and connections substantially rigid in a transverse plane arranged between the axle housings and said frame to resist the swinging movement of said axles in said plane.

8. In combination with a road vehicle frame a driving axle therefor; a housing for said axle; wheels carried by said axle; a shackle connected to said axle housing; spring means connecting said shackle with said frame; means for limiting the relative vertical movement between said axle and said frame including a pair of arms; said arms being pivotally connected together; the ends of the arms being respectively connected to said frame and to said shackle; and resilient means for urging said arms toward collapsed position in which the angle between said arms would approach zero.

9. In combination with a road vehicle frame a driving axle therefor; a housing for said axle; wheels carried by said axle; a shackle connected to said axle housing; spring means connecting said shackle with said frame; means for limiting the relative vertical movement between said axle and said frame including a pair of channel shaped arms; said arms being pivotally connected together; means for pivotally connecting the ends of the arms respectively to said frame and to said shackle; said arms having engageable abutments for determining the extent of vertical movement of said axle with respect to the frame; and spring means connected to one of said arms and said frame for urging said arms toward collapsed position in which the angle between said arms would approach zero.

10. The combination with a road vehicle frame; of a driving arrangement comprising a pair of driving axles spaced longitudinally of the frame; housings for said axles; a pair of shackles journaled on one of said housings; a pair of shackles fixedly secured to the other of said housings; a spring hanger fixedly supported at each side of the frame; a pair of springs arranged adjacent each side of the frame and in vertically spaced relation throughout their lengths, each of said pairs of springs being pivotally connected at one end in separated relation to a shackle of one of said pairs and at its other end in separated relation to a shackle of the other of said pairs; and separate means pivotally connecting the springs of each pair intermediate their ends to one of said hangers.

DELMAR G. ROOS.